US010911307B2

(12) United States Patent
Chaganti et al.

(10) Patent No.: US 10,911,307 B2
(45) Date of Patent: Feb. 2, 2021

(54) SYSTEM AND METHOD FOR OUT OF THE BOX SOLUTION-LEVEL CONFIGURATION AND DIAGNOSTIC LOGGING AND REPORTING

(71) Applicant: Dell Products L.P., Hopkinton, MA (US)

(72) Inventors: Ravikanth Chaganti, Bangalore (IN); Rizwan Ali, Cedar Park, TX (US); Dharmesh M. Patel, Round Rock, TX (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/260,938

(22) Filed: Jan. 29, 2019

(65) Prior Publication Data

US 2020/0244531 A1 Jul. 30, 2020

(51) Int. Cl.
*H04L 29/06* (2006.01)
*H04L 12/24* (2006.01)

(52) U.S. Cl.
CPC ...... *H04L 41/0869* (2013.01); *H04L 41/0873* (2013.01); *H04L 41/0893* (2013.01); *H04L 41/0896* (2013.01); *H04L 63/10* (2013.01)

(58) Field of Classification Search
CPC ..... H04L 63/20; H04L 63/10; H04L 63/0227; H04L 63/0263; G06F 21/6218; G06F 21/54
See application file for complete search history.

(56) References Cited

U.S. PATENT DOCUMENTS

| | | |
|---|---|---|
| 4,780,809 A | 10/1988 | Woffinden et al. |
| 6,098,098 A | 8/2000 | Sandahl et al. |
| 7,636,814 B1 | 12/2009 | Karr et al. |
| 7,987,353 B2 | 7/2011 | Holdaway et al. |
| 8,099,571 B1 | 1/2012 | Driscoll et al. |

(Continued)

OTHER PUBLICATIONS

"Make more time for the work that matters most", retrieved on-line Mar. 4, 2019 at https://asana.com/ (5 pages).

(Continued)

*Primary Examiner* — Chirag R Patel
(74) *Attorney, Agent, or Firm* — Chamberlain, Hrdlicka, White, Williams & Aughtry

(57) ABSTRACT

A configurable device for use in a solution architecture includes persistent storage and a computing resource manager. The persistent storage stores computing resources rules based on, in part, the solution architecture. The persistent storage stores a computing resource configuration that specifies characteristics of computing resources of the configurable device that must be met for the computing resources to be in a predetermined state to meet requirements of the solution architecture. The computing resources manager generates a rules-based script using the computing resources rules and a portion of the computing resource configuration; executes the rules-based script to obtain a validation report that specifies a compliance failure of a portion of the computing resources; and remediates the compliance failure by modifying the computing resources of the configurable device based on a remediation action specified by the computing resources rules.

17 Claims, 9 Drawing Sheets

(56) References Cited

U.S. PATENT DOCUMENTS

| | | | |
|---|---|---|---|
| 8,161,255 B2 | 4/2012 | Anglin et al. |
| 8,190,835 B1 | 5/2012 | Yueh |
| 8,364,917 B2 | 1/2013 | Bricker et al. |
| 8,386,930 B2 | 2/2013 | Dillenberger et al. |
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 * | 7/2017 | Nagineni ............ G06F 11/3684 |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,185,624 B2 | 1/2019 | Akutsu et al. |
| 10,241,695 B2 | 3/2019 | Baptist et al. |
| 10,339,455 B1 | 7/2019 | Parush-Tzur et al. |
| 10,409,778 B1 | 9/2019 | Zhao et al. |
| 10,503,413 B1 | 12/2019 | Gal et al. |
| 10,503,611 B1 | 12/2019 | Srivastav et al. |
| 2001/0044879 A1 | 11/2001 | Moulton et al. |
| 2003/0058277 A1 | 3/2003 | Bowman-Amuah |
| 2003/0172145 A1 | 9/2003 | Nguyen |
| 2003/0177205 A1 | 9/2003 | Liang et al. |
| 2004/0128587 A1 | 7/2004 | Kenchammana-Hosekote et al. |
| 2005/0076049 A1 | 4/2005 | Qubti et al. |
| 2007/0283011 A1 | 12/2007 | Rakowski et al. |
| 2008/0244204 A1 | 10/2008 | Cremelie et al. |
| 2009/0077165 A1 | 3/2009 | Rhodes et al. |
| 2009/0094250 A1 | 4/2009 | Dhuse et al. |
| 2009/0265360 A1 | 10/2009 | Bachwani et al. |
| 2011/0099351 A1 | 4/2011 | Condict |
| 2011/0246597 A1 | 10/2011 | Swanson et al. |
| 2013/0067459 A1 | 3/2013 | Sannidhanam et al. |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0297603 A1 | 10/2014 | Kim et al. |
| 2015/0058582 A1 | 2/2015 | Baldwin et al. |
| 2015/0161000 A1 | 6/2015 | Kim et al. |
| 2015/0220400 A1 | 8/2015 | Resch |
| 2015/0355980 A1 | 12/2015 | Volvovski et al. |
| 2016/0062674 A1 | 3/2016 | Benight et al. |
| 2016/0085630 A1 | 3/2016 | Gardner |
| 2016/0246537 A1 | 8/2016 | Kim |
| 2017/0099187 A1 | 4/2017 | Dale et al. |
| 2017/0160983 A1 | 6/2017 | Fiske et al. |
| 2017/0192868 A1 | 7/2017 | Vijayan et al. |
| 2017/0206034 A1 | 7/2017 | Fetik |
| 2017/0235609 A1 | 8/2017 | Wires et al. |
| 2018/0018235 A1 | 1/2018 | Arslan et al. |
| 2018/0060894 A1 | 3/2018 | Beveridge et al. |
| 2018/0157532 A1 | 6/2018 | Kumar et al. |
| 2018/0189109 A1 | 7/2018 | Nagai et al. |
| 2018/0278597 A1 | 9/2018 | Helms et al. |
| 2018/0307560 A1 | 10/2018 | Vishnumolakala et al. |
| 2018/0322558 A1 | 11/2018 | Padmanabh et al. |
| 2019/0104398 A1 | 4/2019 | Owen et al. |
| 2019/0109772 A1 | 4/2019 | Lipstone et al. |
| 2019/0197023 A1 | 6/2019 | Chennamsetty et al. |
| 2019/0379588 A1 | 12/2019 | Rao |
| 2020/0050689 A1 | 2/2020 | Tal et al. |

OTHER PUBLICATIONS

"Project Management Redefined", retrieved on-line Mar. 4, 2019 at https://www.robohead.net/features-2/ (2 pages).

"Features" Project Management Tools, retrieved on-line Mar. 4, 2019 at https://www.proworkflow.com/features-project-management-tools/ (7 pages).

Suzhen Wu et al.;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028).

* cited by examiner

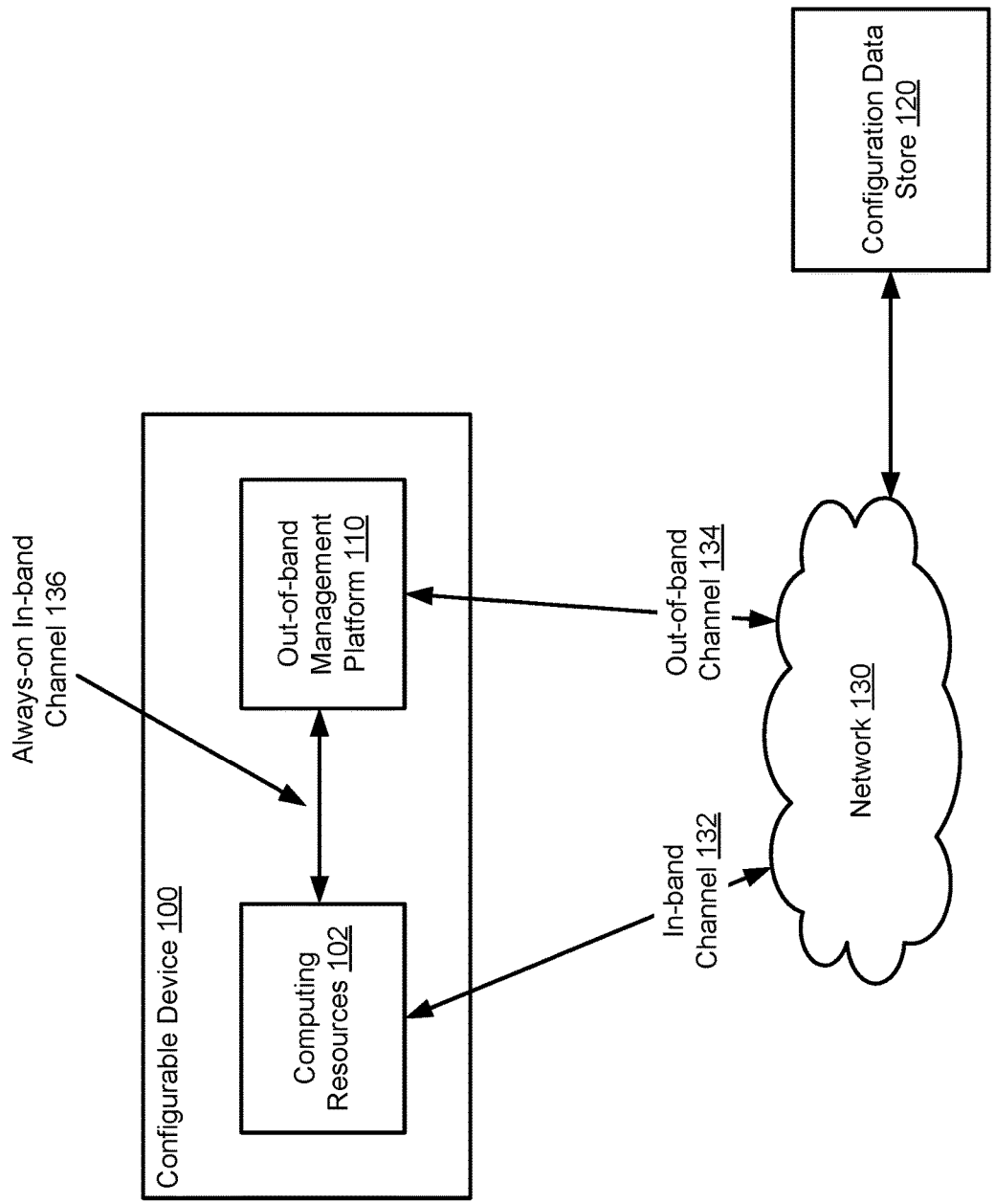
FIG. 1.1

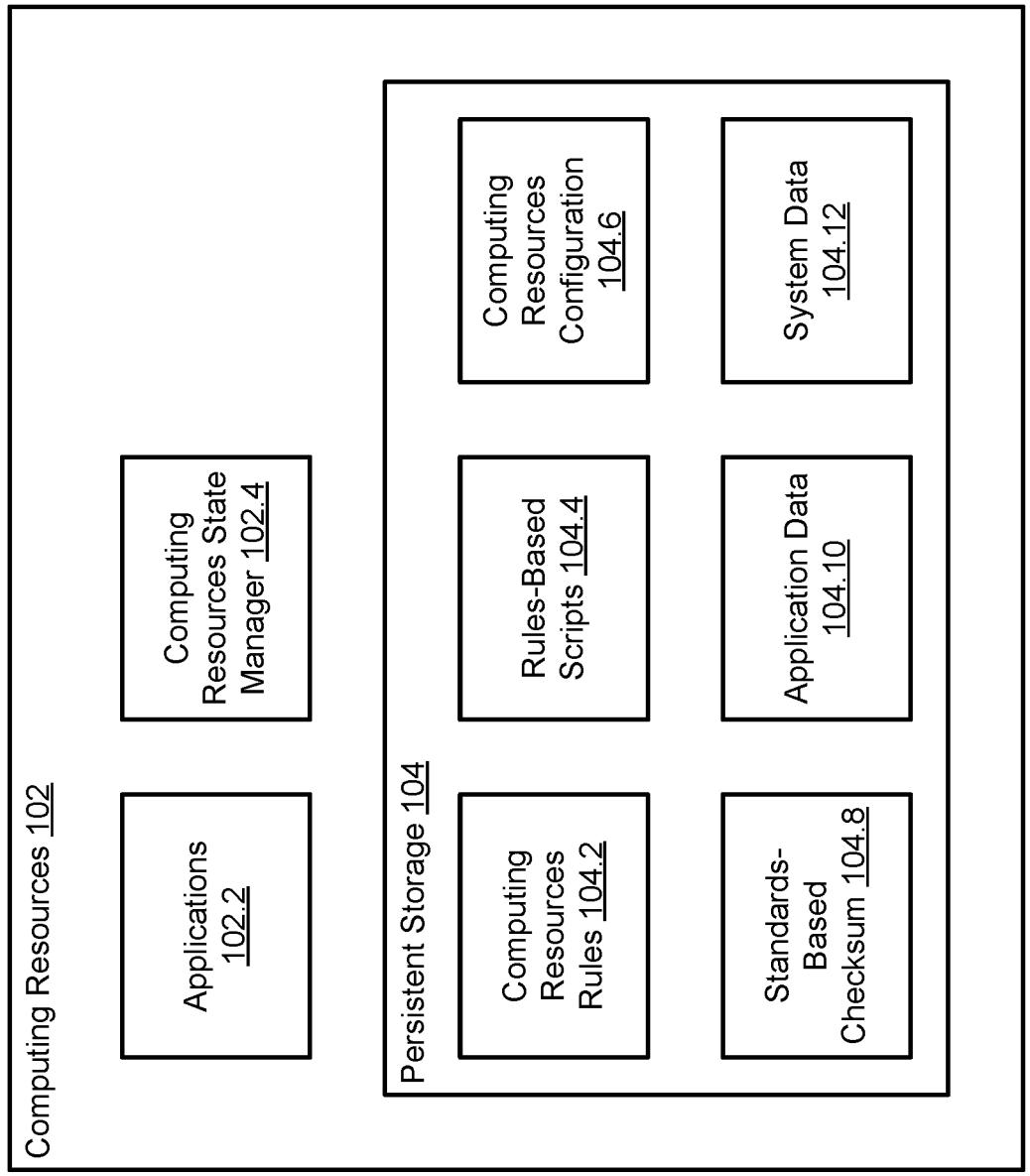
FIG. 1.2

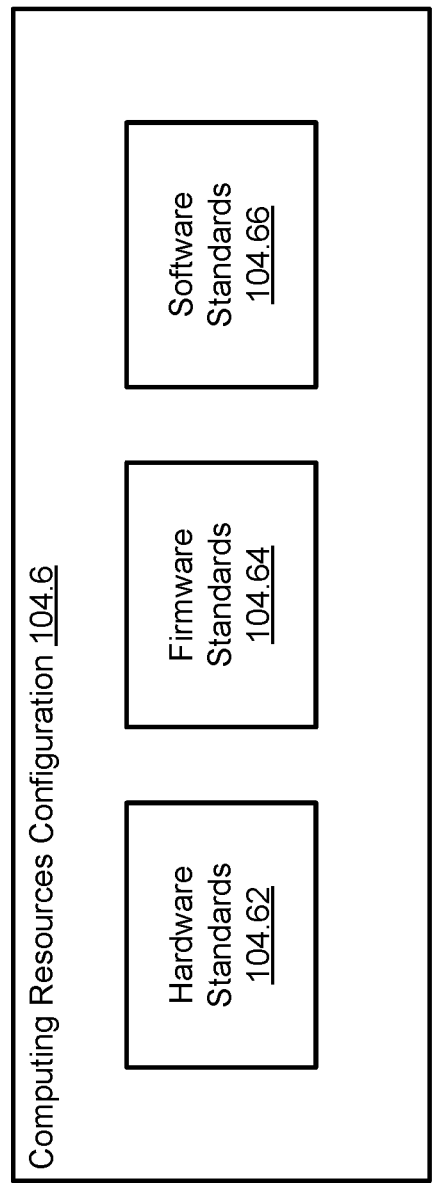
FIG. 2.1

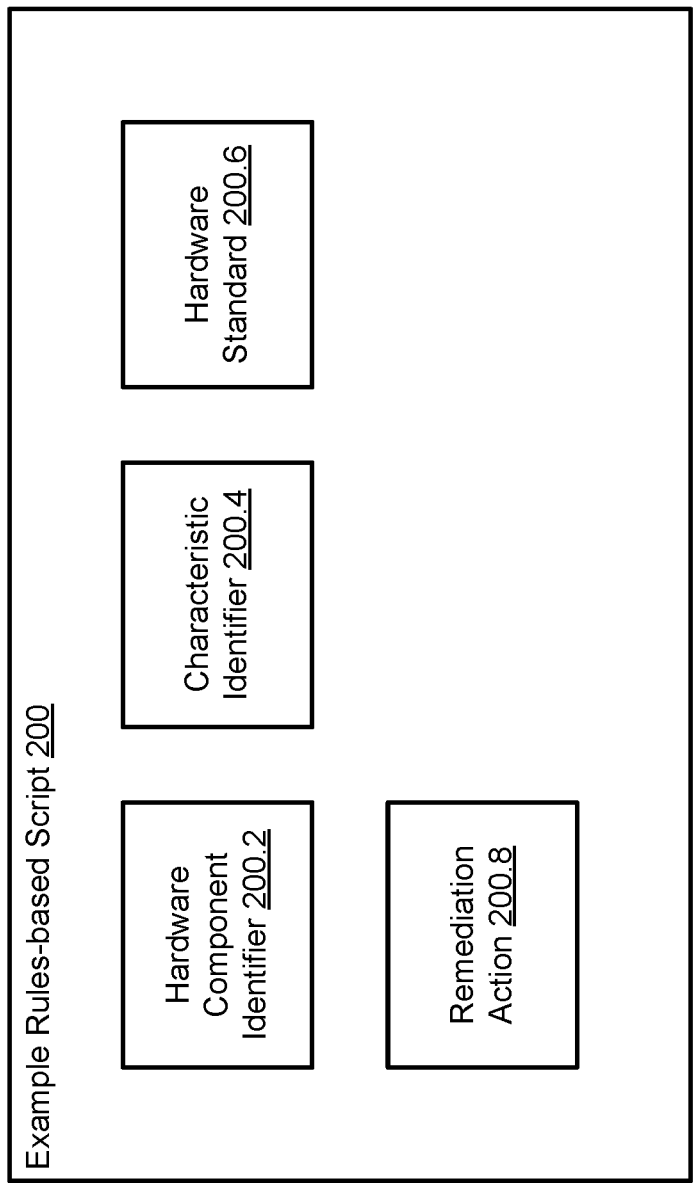
FIG. 2.2

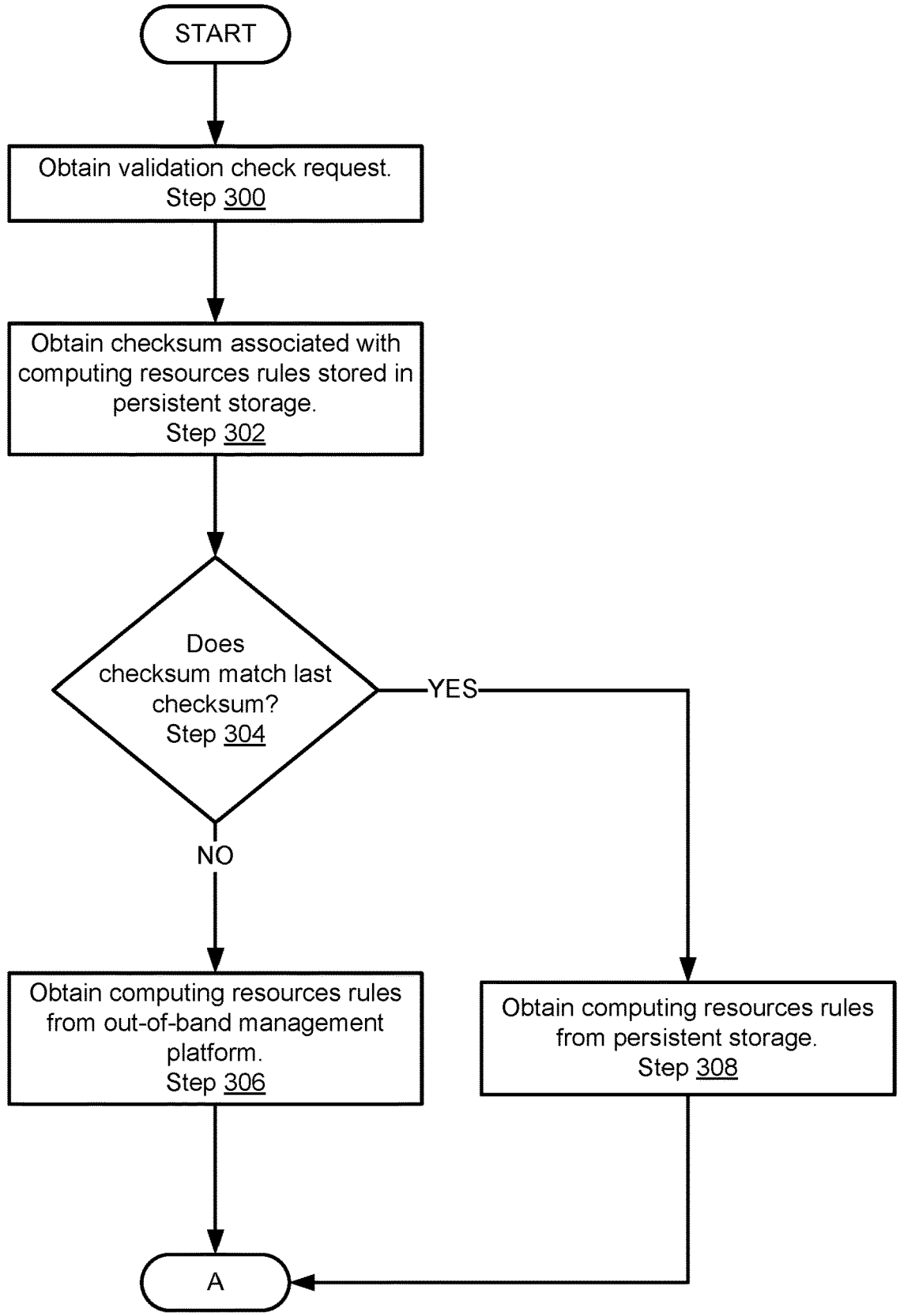
FIG. 3.1

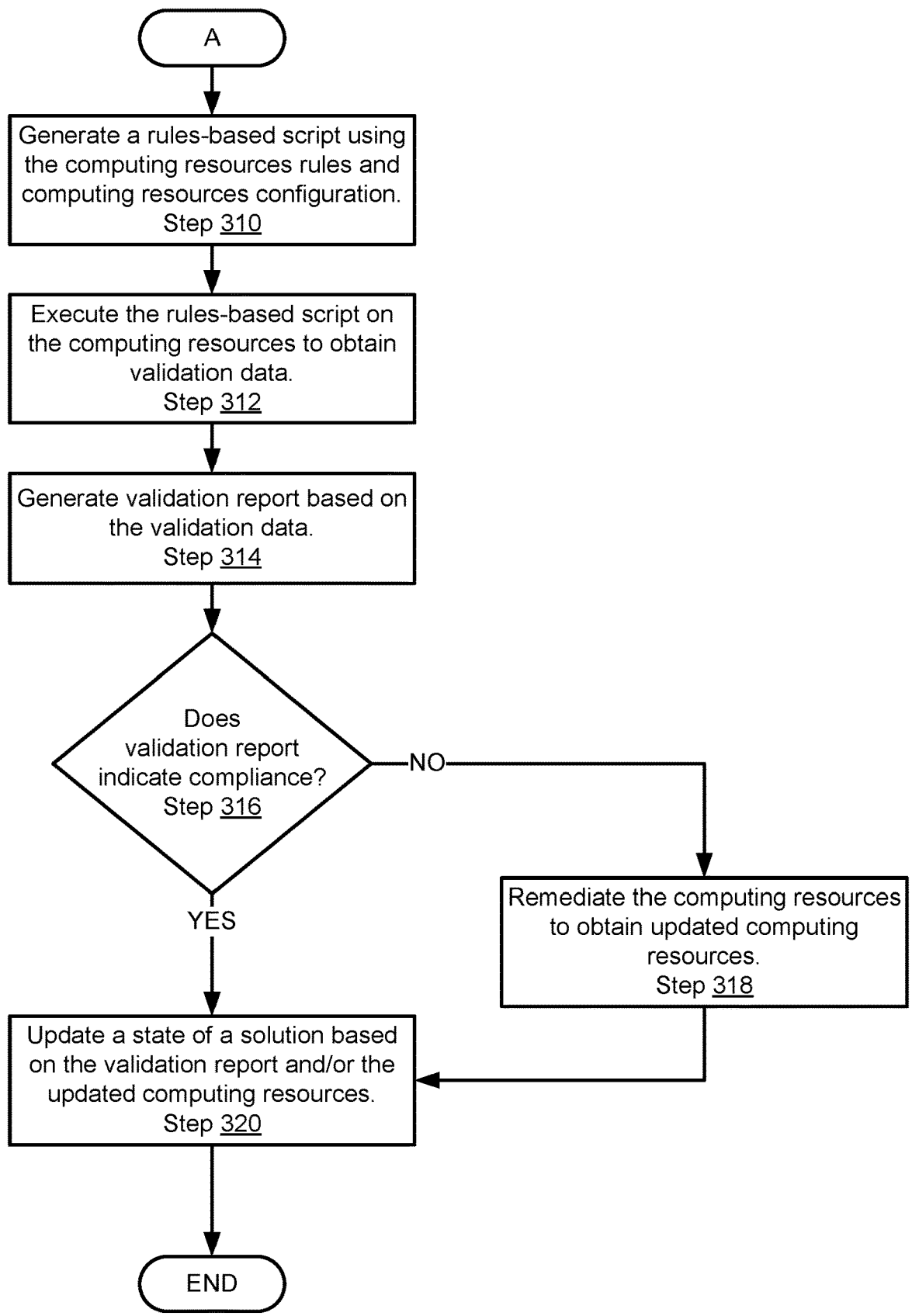
FIG. 3.2

Example Computing Resources 400

| First Processor 402.2 | Inoperable Second Processor 402.4 | Memory 402.6 |

| Web Page Server 404.2 | Database Manager 404.4 | Slow Fileserver 404.6 |

Computing Resources State Manager 406.2

Persistent Storage 408

| Database Archive 408.2 | File Archive 408.4 |

FIG. 4.1

Example Computing Resources Rules 420

- Processor Rule 420.2
- File Server Rule 420.4
- Database Archive Rule 420.6

FIG. 4.2

Example Rules-based Scripts 430

First Script 432
- First Processor Identifier 432.2
- Operating Point 432.4
- Operational 432.6
- Suspend Operation 432.8

Second Script 434
- File Server Identifier 434.2
- Serve Rate 434.4
- 200 Files per Second 434.6
- Allocate Additional Resources 434.8

Third Script 436
- Database Archive Identifier 436.2
- Size 436.4
- Less than 10 Gigabytes 436.6
- Accelerate Garbage Collection 436.8

FIG. 4.3

SYSTEM AND METHOD FOR OUT OF THE BOX SOLUTION-LEVEL CONFIGURATION AND DIAGNOSTIC LOGGING AND REPORTING

BACKGROUND

Computing devices may provide services to other computing devices. For example, a computing device hosting application such as a website server may provide services to other computing devices by serving webpages to the other computing devices. The computing devices may be connected by operable connections such as, for example, the Internet. The computing devices may host any number of applications. Each of applications may provide different types, or the same types, of services.

To provide services to other devices, computing devices may be configured. Configuring a computing device may change the manner in which the computing device operates. For example, different instructions may be executed by a processor of a computing device giving rise to a different service being provided by the computing device after configuration.

SUMMARY

In one aspect, a configurable device for use in a solution architecture in accordance with one or more embodiments of the invention includes persistent storage and a computing resource manager. The persistent storage stores computing resources rules based on, in part, the solution architecture and the persistent storage stores a computing resource configuration that specifies characteristics of computing resources of the configurable device that must be met for the computing resources to be in a predetermined state to meet requirements of the solution architecture. The computing resources manager generates a rules-based script using the computing resources rules and a portion of the computing resource configuration; executes the rules-based script to obtain a validation report that specifies a compliance failure of a portion of the computing resources; and remediates the compliance failure by modifying the computing resources of the configurable device based on a remediation action specified by the computing resources rules.

In one aspect, a method for managing a configurable device for a solution architecture in accordance with one or more embodiments of the invention includes generating, by computing resources of the configurable device, a rules-based script using computing resources rules and a portion of a computing resource configuration that are both stored in persistent storage of the computing resources. The computing resources configuration specifies characteristics of the computing resources of the configurable device that must be met for the computing resources to be in a predetermined state to meet requirements of the solution architecture. The method further includes executing the rules-based script to obtain a validation report that specifies a compliance failure of a portion of the computing resources. The method further includes remediating the compliance failure by modifying the computing resources of the configurable device based on a remediation action specified by the computing resources rules.

In one aspect, a non-transitory computer readable medium in accordance with one or more embodiments of the invention includes computer readable program code, which when executed by a computer processor enables the computer processor to perform a method for managing a configurable device for a solution architecture. The method includes generating, by computing resources of the configurable device, a rules-based script using computing resources rules and a portion of a computing resource configuration that are both stored in persistent storage of the computing resources. The computing resources configuration specifies characteristics of the computing resources of the configurable device that must be met for the computing resources to be in a predetermined state to meet requirements of the solution architecture. The method further includes executing the rules-based script to obtain a validation report that specifies a compliance failure of a portion of the computing resources. The method further includes remediating the compliance failure by modifying the computing resources of the configurable device based on a remediation action specified by the computing resources rules.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of computing resources in accordance with one or more embodiments of the invention.

FIG. 2.1 shows a diagram of a computing resources configuration in accordance with one or more embodiments of the invention.

FIG. 2.2 shows a diagram of an example rules-based script in accordance with one or more embodiments of the invention.

FIG. 3.1 shows a diagram of a flowchart of a method of managing a configurable device in accordance with one or more embodiments of the invention.

FIG. 3.2 shows a continuation of the flowchart of FIG. 3.1.

FIG. 4.1 shows a diagram of an example of computing resources.

FIG. 4.2 shows a diagram of an example of a computing resources configuration associated with the computing resources of FIG. 4.1.

FIG. 4.3 shows a diagram of an example of rules-based scripts generated based on the computing resources configuration of FIG. 4.2.

DETAILED DESCRIPTION

Figure 5:
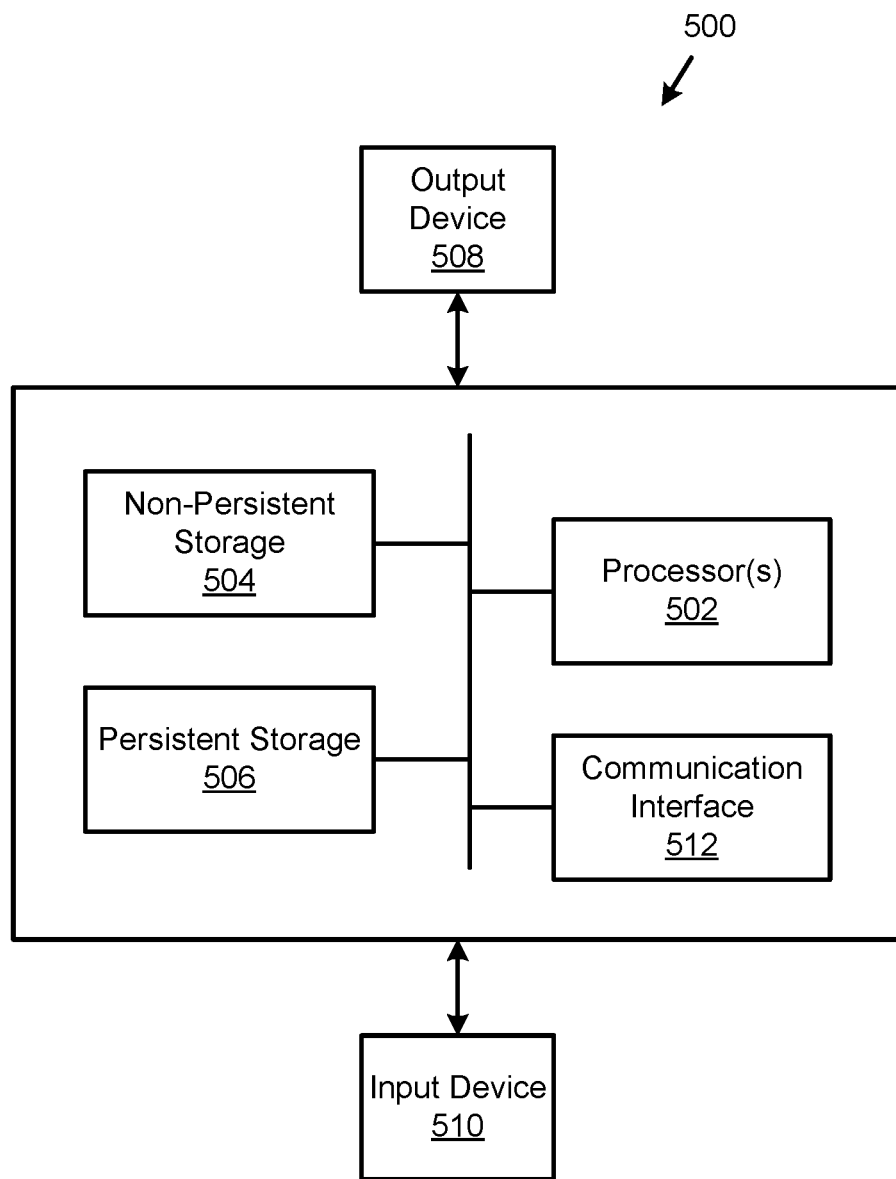
FIG. 5 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for configuring any number of configurable devices. Additionally, embodiments of the invention may provide for the continuous monitoring of configuration processes of configurable devices. By doing so, embodiments of the invention may reduce a time required for detection of a configuration failure.

In general, embodiments of the invention relate to systems, devices, and methods for managing hardware and/or software drift of configurable devices of a solution architecture. A solution architecture may be a distributed system that provides predetermined functionality. The solution architecture may provide such functionality based on cooperative operation of any number of configurable devices of the solution architecture.

In one or more embodiments of the invention, the solution architecture manages devices by checking a specific set of characteristics, e.g., a limited number of characteristics, of the computing resources of each of the configurable devices. By only checking the specific set of characteristics of the computing resources, the computing resource cost for performing such checking may be substantially reduced when compared to contemporary methods for managing drift. Thus, embodiments of the invention may provide a robust and computationally efficient device management solution for distributed computing systems.

FIG. 1.1 shows a diagram of an example system in accordance with one or more embodiments of the invention. The example system may provide compliance services to a configurable device (100). While illustrated as only including a single configurable device (e.g., 100), systems in accordance with embodiments of the invention may include any number of configurable devices.

To provide compliance services to the configurable device (100), the system may further include a configuration data store (120) that provides data for configuring the configurable device (100).

Any of the devices of FIG. 1.1 may be operably connected by any combination of wired and/or wireless networks. For example, the configurable device (100) may be operably connected to the configuration data store (120) and/or other entities (not shown) by a network (130). Additionally, the system may include at least one in-band channel (e.g., 132) associated with the configurable device (100) and at least one out-of-band channel (134) associated with the configurable device (100).

While for the sake of brevity the system of FIG. 1.1 has been illustrated as including a limited number of components, embodiments of the invention may include additional components without departing from the invention. Each component of the system of FIG. 1.1 is described below.

The configurable device (100) may provide services to other entities (not shown). For example, the configurable device (100) may host any number of applications that provide computing services to other entities. The computing services may be, for example, database services, email services, instant messaging services, file storage services, and/or any other type of computer implemented services.

The other entities may be, for example, clients that rely on the services provided by the applications. Alternatively, the other entities may be, for example, other configurable devices of a distributed system that provides predetermined functionality. For example, the configurable device (100) may be one device of multiple devices of a distributed system. The configurable device (100) may be adapted to receive configuration instructions from other entities to self-configure. Self-configuring the configurable device (100) may place the configurable device (100) into a predetermined state. The predetermined state may enable the configurable device (100) to cooperatively perform functions of the distributed system with other configurable devices of the distributed system.

The configurable device (100) may be a physical device. The physical device may be a computing device. The computing device may be, for example, a mobile phone, tablet computer, laptop computer, desktop computer, server, or cloud resource. The configurable device (100) may be other types of computing devices without departing from the invention. To provide the above-noted functionality of the configurable device (100), the computing device may include computing resources (102) and host an out-of-band management platform (110). Each of these components of the computing device is discussed below.

In one or more embodiments of the invention, the computing resources (102) include both physical and logical resources. The physical resources may include one or more processors, memory (e.g., random access memory), and persistent storage (104) (e.g., disk drives, solid state drives, etc.). An example of physical resources of a computing device is shown in FIG. 5. The persistent storage may store computer instructions, e.g., computer code, that when executed by the processor(s) of the computing device cause the computing device to perform the functions of the configurable device (100) described in this application and/or all, or a portion, of the methods illustrated in FIGS. 3.1-3.2. The physical resources may include additional, fewer, or different hardware resources without departing from the invention.

The logical resources may include any number of applications executing using the physical resources of the configurable device (100). Some of these applications may provide services to other entities, as noted above, and other applications may provide compliance services for the computing resources (102) of the configurable device. The compliance services may include, for example, determining whether the physical resources of the computing resources (102) are in a predetermined state, determining whether the applications hosted by the logical resources of the computing resources (102) are in a predetermined state, and/or acting based on the determinations regarding the physical resources and/or applications. For additional details regarding computing resources (102), refer to FIG. 1.2.

Additionally, the computing resources (102) may support an in-band channel (136). The always-on in-band connection (136) may provide dedicated connectivity between the computing resources (102) and the out-of-band management platform (110). For example, the computing resources (102) may include a network adapter that supports communications via the network (130). Alternatively, the always-on in-band channel may be a bus between the out-of-band management platform (110) and the computing resources (102).

In one or more embodiments of the invention, the out-of-band management platform (110) provides standards enforcement services. By providing standards enforcement services, a state of the computing resource (102) may be maintained over time. For example, changes made to the computing resources (102) by users or other entities may cause a state of the computing resources (102) to drift from a predetermined state. The predetermined state may reflect a state in which the computing resources (102) are known to operate efficiently and/or correctly. In contrast, when the state of the computing resources (102) drifts the computing resources (102) may operate inefficiently or not operate at all.

Providing standards enforcement services may include, but is not limited to, (i) determining an identity of the configurable device, (ii) obtaining computing resources rules-based on an identity of the configurable device (100), (iii) providing the compliance services to the computing resources (102) using the obtained computing resources rules, (iv) remediating the computing resources based on the compliance services, and/or (iv) reporting the state of the computing resources (102) determined when providing compliance services to management entities. By providing standards enforcement services to the computing resources (102), the configurable device (100) may more efficiently provide predetermined functionality of the configurable device (100).

To further clarify by way of example, consider a scenario in which the state of the computing resources (102) drifts from a predetermined state which facilitates the efficient provision of services by the configurable device (100). In the drifted state, the configurable device (100) may be less able to provide, for example, file sharing services to other entities because of an automatic driver update that inadvertently caused the computing resources (102) to be less able to perform computations. If the state of the computing resources (102) is left in the drifted state, the efficiency of services provided by the configurable device (100) may be reduced.

The out-of-band management platform (110) may remediate such a scenario by providing standards enforcement services to the computing resources (102). By doing so, the efficiency of services provided by the configurable device (100) may be improved.

To provide standards enforcement services, the out-of-band management platform (110) may cooperate with entities executing using the computing resources (102). For example, a computing resources management agent hosted by the computing resources may cooperate with the out-of-band management platform (110) to provide standards enforcement services. For additional details regarding the computing resources management agent, refer to FIG. 1.2.

To provide the above noted functionality, the out-of-band management platform (110) may perform all, or portion, of the methods illustrated in FIGS. 3.1-3.2.

Additionally, the out-of-band management platform (110) may support an out-of-band channel (134). For example, the out-of-band management platform (110) may include a network adapter, separate from a network adapter of the computing resources (102), which supports communications via the network (130). Further, the out-of-band management platform (110) may support the always-on in-band channel (136) between the out-of-band management platform (110) and the computing resources (102) of the configurable device (100). For example, the out-of-band management platform (110) may be directly connected to the computing resources (102) by a network bus or other communication channel that is not impacted by components external to the configurable device (100).

In some embodiments of the invention, the always-on in-band channel (136) is the same as the in-band channel (132). For example, the computing resources (102) and the out-of-band management platform (110) may each include separate network adapters operably connected via the network (130) and, thereby, provide a communication channel between the computing resources (102) and the out-of-band management platform (110).

In one more embodiments of the invention, the computing resources (102) and the out-of-band management platform (110) are identified as separate devices for networking purposes. For example, each of these components may include separate network identification information such as media access control addresses and/or Internet protocol addresses. Thus, each of these components of the configurable device (100) may present themselves as separate devices to other entities operably connected to the network (130). Additionally, each of these components may be operably connected to the network (130) via different network management devices such as, for example, routers or switches. By doing so, the failure of network management devices operably connected to one of these components may not impact the network connectivity of both components.

The out-of-band management platform (110) may be a physical device. The physical device may be a computing device. The computing device may be, for example, an embedded hardware device such as, for example, an expansion card, a component integrated into a mainboard of a computing device, or another hardware entity. The computing device may include one or more processors, memory (e.g., random access memory), and persistent storage (e.g., disk drives, solid state drives, etc.). An example computing device is shown in FIG. 5. The persistent storage may store computer instructions, e.g., computer code, that when executed by the processor(s) of the computing device cause the computing device to perform the functions of the out-of-band management platform (110) described in this application and/or all, or a portion, of the methods illustrated in FIGS. 3.1-3.2. The out-of-band management platform (110) may be other types of computing devices without departing from the invention.

While the out-of-band management platform (110) has been described as a physical device, the out-of-band management platform (110) may be implemented as a logical device, e.g., a virtual device, which utilizes computing resources of other physical computing devices without departing from the invention. For example, the out-of-band management platform (110) may be implemented as a logical device that utilizes computing resources of the configurable device (100) or other entities operably connected to the configurable device (100). Further, the out-of-band management platform (110) may be implemented as a management node, i.e., a computing device operably connected to the configurable device (100), or a management console without departing from the invention.

In one or more embodiments of the invention, the configuration data store (120) provides configuration data services to the configurable device (100). By providing configuration data services to the configurable device (100), the configurable device (100) may prevent the state of the computing resources (102) from drifting. Providing configuration data services to the configurable device (100) may include providing information utilized by the configurable device (100) to configure itself. For example, the configurable device (100) may request information from the configuration data store (120) when configuring itself. In response, the configuration data store (120) may provide the requested information.

In one or more embodiments of the invention, the configuration data store (120) stores: (i) rules associated with different types of configurable devices and/or (ii) profiles associated with configurable devices. These data structures may be used to determine whether the computing resources (102) have drifted and/or used to remediate a state of the computing resources (102).

The rules may specify characteristics of the associated configurable devices. The rules may be used when determining whether the computing resources (102) have drifted from a predetermined state. The rules may be retrieved by the out-of-band management platform (110) via the out-of-band channel. The obtained rules may be provided to an entity hosted by the computing resources (102) that compares the state of the computing resources (102) to the rules to determine whether the state of the computing resources (102) has drifted.

In one or more embodiments of the invention, the rules may be stored on the out-of-band management platform (110) rather than the configuration data store (120). For example, the rules may be stored in storage of the out-of-band management platform (110). The rule may be present prior to shipping of the configuration device (100) to a user or administrator of the configurable device (100).

The profiles associated with the configurable device may specify characteristics of the computing resources (102). The characteristics may be hardware components, hardware component settings, firmware, firmware settings, applications, application settings, and/or any other hardware or software characteristic of the computing resources (102). The profiles may be retrieved by the out-of-band management platform (110) via the out-of-band channel. For example, a profile associated with the configurable device (100) may be retrieved. The obtained profile may be provided to an entity hosted by the computing resources (102) to remediate the state of the computing resources (102) so that the computing resources (102) are in a predetermined state. In one or more embodiments of the invention, the profile may be used to identify any number of differences between the actual state of the computing resources (102) and a predetermined state of the computing resources (102) specified by the obtained profile.

In one or more embodiments of the invention, the configuration data store (120) includes functionality to send and receive data via the network (130) and respond to queries for data from the configurable device (100). The configuration data store (120) may provide database services, or other data management services, to the configurable device (100) to provide information requested by the configurable device (100) and/or other entities.

While illustrated as being operably connected to a single configurable device (e.g., 100), the configurable device (100) may service any number of configurable devices without departing from the invention.

The configuration data store (120) may be a physical device. The physical device may be a computing device. The computing device may be, for example, a mobile phone, tablet computer, laptop computer, desktop computer, server, or cloud resource. The configuration data store (120) may be other types of computing devices without departing from the invention. The computing device may include one or more processors, memory (e.g., random access memory), and persistent storage (e.g., disk drives, solid state drives, etc.).

An example computing device is shown in FIG. 5. The persistent storage may store computer instructions, e.g., computer code, that when executed by the processor(s) of the computing device cause the computing device to perform the functions of the configuration data store (120) described in this application and/or all, or a portion, of the methods illustrated in FIGS. 3.1-3.2. The configuration data store (120) may be other types of computing devices without departing from the invention.

The configuration data store (120) may be a virtualized entity. For example, the configuration data store (120) may be implemented as a virtual machine that utilizes the computing resources of any number of physical computing devices to provide the functionality of the configuration data store (120).

As discussed above, the computing resources (102) may: (i) provide services to other entities via hosted applications and (ii) perform standards enforcement services with respect to the computing resources (102) in cooperation with the out-of-band management platform (110). The computing resources (102) may perform other actions without departing from the invention. FIG. 1.2 shows a diagram of computing resources (102) in accordance with one or more embodiments of the invention.

To provide the above noted functions, the computing resources (102) may include application (102.2). The applications (102.2) may be entities hosted by the computing resources (102) that execute using the physical computing resources of the computing resources (102) and/or other entities. Any number of applications (102.2) may be hosted by the computing resources (102). Each of the applications (102.2) may provide any type of computing service to any number and type of entity.

Because of the complicated interactions between the applications (102.2), physical computing resources, and/or other components of the computing resources (102), it may be difficult to predict a behavior of the computing resources (102) when a state of the computing resources has drifted from a predetermined state. To improve the likelihood of efficient and complete functionality of the computing resources (102), the computing resources (102) may include a computing resources state manager (102.4).

The computing resource state manager (102.4) may manage the state of the computing resources (102). The computing resources state manager (102.4) may monitor the state of the computing resources (102) and act in response to state drifts. To provide this functionality, the computing resources state manager (102.4) may perform all, or a portion, of the methods illustrated in FIGS. 3.1-3.2.

In one or more embodiments of the invention, the computing resources state manager (102.4) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device cause the physical device to perform the functions of the computing resources state manager (102.4) described throughout this application.

In one or more embodiments of the invention, the computing resources state manager (102.4) is implemented as a logical entity. For example, the computing resources state manager (102.4) may be an application executing using computing resources of the computing resources (102).

The computing resources may also include a persistent storage (104). The persistent storage (104) may be a physical device for storing digital data. The persistent storage (104) may include any number of physical devices for storing digital data. The physical devices may be, for example, hard disk drives, solid state drives, tape drives, and any other type of physical device for persistent storage of data.

In one or more embodiments of the invention, the persistent storage (104) is a virtualized resource. For example, the persistent storage (104) may be a virtual drive. The virtual drive may use computing resources of any number of physical computing devices without departing from the invention.

In one or more embodiments of the invention, the persistent storage (104) stores data structures. For example, the persistent storage (104) may store computing resources rules (104.2), rules-based scripts (104.4), a computing resources configuration (104.6), a standards-based checksum (104.8), application data (104.10), and/or system data (104.12). Each of these data structures is discussed below.

The computing resources rules (104.2) may be a data structure that stores information regarding a set of rules that may be used to determine whether the computing resources (102) are in a predetermined state. The set of rules may specify any number of characteristics regarding the hardware and/or software state of the computing resources (102). In one or more embodiments of the invention, the set of rules specifies a subset of all of the characteristics of the computing resources (102).

For example, the computing resources rules (104.2) may only specify characteristics of a predetermined set of the applications (102.2). Thus, the set of rules may reflect a limited number of characteristics of the computing resources (102) rather than all of the characteristics of the computing resources (102) that define a state of the computing resources (102).

In one or more embodiments of the invention, the computing resources rules (104.2) are obtained from the computing resources state manager (102.4). The obtained set of rules may be associated with an identity of a configurable device that includes the computing resources (102). For example, the identity of the configurable device may indicate predetermined functionality that the configurable device is to provide within a larger, distributed computing system architecture that include multiple configurable devices. Thus, the obtained set of rules may reflect a desired functionality of the configurable device.

In one or more embodiments of the invention, the set of rules includes specifications for an application loadout of the computing resources (102). An application loadout may specify a number of applications that must be simultaneously executing using the computing resources (102) to provide a predetermined functionality. For example, an application loadout may specify an instance of a database application, an instance of an authenticator application, and an instance of an intrusion detection application.

In one or more embodiments of the invention, the set of rules includes specifications for a hardware loadout of the computing resources (102). A hardware loadout may specify a number of hardware components that must be included in the computing resources (102) to provide a predetermined functionality. For example, a hardware loadout may specify a number of processing cores, a quantity of memory, and a quantity of storage.

The rules-based scripts (104.4) may be a data structure including script code. The script code may be executable by the computing resources (102). The script code may be based on the computing resources rules (104.2). When executed, the script code may determine whether the computing resources (102) meet the requirements of the computing resources rules (104.2). For additional details regarding rules-based scripts, refer to FIG. 2.2.

The computing resources configuration (104.6) may be a data structure that includes information regarding a predetermined state of the computing resources (102). The information regarding the predetermined state may specify any number of characteristics of the computing resources (102) that, when met, place the computing resources (102) into the predetermined state. For additional information regarding the computing resources configuration (104.6), refer to FIG. 2.1.

The standards-based checksum (104.8) may be a data structure that includes information regarding the computing resources rules (104.2) used to perform a previous comparison between the state of the computing resources (102) and the computing resources configuration (104.6). When a subsequent comparison is to be performed, the standards-based checksum (104.8) may be used to determine whether the computing resources rules (104.2) have changed since the previous comparison. If the standards-based checksum (104.8) matches a checksum generated using the computing resources rules (104.2), the rules are deemed not to have changed and the rules-based scripts (104.4) may be used to perform the checksum. If not, new rules-based scripts (104.4) may need to be generated.

The application data (104.10) may be data generated by the applications (102.2). The application data (104.10) may include any type and quantity of data.

The system data (104.12) may be data used by an operating system (not shown) or other management entity hosted by the computing resources (102). The system data (104.12) may be used to operate or otherwise manage the computing resources (102). The system data (104.12) may include, for example, firmware settings, hardware settings, drivers, etc.

While the persistent storage (104) is illustrated as including the limited number of data structures, the persistent storage (104), may store additional, fewer, or different data structures than that illustrated in FIG. 1.2 without departing from the invention. Additionally, any of the data structures illustrated in FIG. 1.2 may be combined with other data, broken down into multiple data structures, stored in different locations, replicated, and/or spanned across any number of computing devices without departing from the invention.

To further clarify aspects of embodiments of the invention, diagrams of a computing resources (104.6) and an example rules-based script (200) in accordance with one or more embodiments of the invention are discussed below.

FIG. 2.1 shows a diagram of a computing resources configuration (104.6) in accordance with one or more embodiments of the invention. As discussed above, the computing resources configuration (104.6) may be a data structure that includes information regarding characteristics of computing resources associated with a predetermined state. The computing resources configuration (104.6) may include hardware standards (104.62), firmware standards (104.64), and software standards (104.66). Each component of the computing resources configuration (104.6) is discussed below.

The hardware standards (104.62) may specify the hardware components necessary to achieve a predetermined state. The hardware standards (104.62) may specify a type and/or quantity of processing resources, memory resources, storage resources, and/or communication resources. The hardware standards (104.62) maybe specified at any level of granularity and in any manner.

The firmware standards (104.64) may specify the firmware necessary to achieve a predetermined state. The firmware standards (104.64) may specify a type and settings of firmware hosted by computing resources. The firmware standards (104.64) maybe specified at any level of granularity and in any manner.

The software standards (104.66) may specify the software necessary to be hosted by computing resources to achieve a predetermined state. The software standards (104.66) may specify a type and settings of software hosted by the computing resources. The software standards (104.66) maybe specified at any level of granularity and in any manner.

FIG. 2.2 shows a diagram of an example rules-based script (200) in accordance with one or more embodiments of the invention. As discussed above, rules-based scripts may be generated based on computing resources rules and computing resources configuration.

For example, the computing resources rules may be specified as Gherkin features. Each of the Gherkin features may be associated with step files that specify how each Gherkin feature may be implemented in script code (or other code). The step files may include placeholders for parameters specified by the computing resources configuration. Adding the parameters to the step files may generate completed step files that are executable. Thus, the example rules-based script (200) may be generated by aggregating the completed step files.

The computing resources rules may be specified using other methods without departing from the invention. For example, any type of declarative language linked to parameterized executed code may be used rather than Gherkin features. Other types of data structures for specifying the computing resources rules may be used without departing from the invention.

A rules-based script (200) may include any number of portions that each serve to determine whether a particular characteristic of the computing resources meets the requirements of the computing resources configuration. To further clarify by way of example, the example rules-based script (200) includes a hardware component identifier (200.2) that identifies a particular component of computing resources. The example rules-based script (200) further includes a characteristic identifier (200.4) that specifies what is being compared, e.g., speed of a processor, bandwidth of a memory. The example rules-based script (200) also includes a hardware standard (200.6) that specifies the standard by which the comparison is made, e.g., 200 megabytes per second memory bandwidth, 10,000 input-outputs per second. The example rules-based script (200) may also include a remediation action (200.8) that may be performed when the characteristic of computing resources specified by the characteristic identifier (200.4) does not meet the hardware standard (200.6). Thus, these components of the example rules-based script (200) may be used to determine whether a characteristic of computing resources of a configurable device meets the requirements of the computing resources configuration.

While illustrated as including a limited number of components, the example rules-based script (200) may include any number of such components to perform comparisons on any number of hardware and/or software characteristics of the computing resources of a computing device. Consequently, the computing resource cost of generating a rules-based script (200) may be significant. Thus, it may be advantageous to not generate rules-based scripts unless needed.

For example, generating a rules-based script may reduce the computing resources available for execution of applications that provide services to other entities. Thus, the ability of a configurable device to perform its primary purpose may be limited if required to frequently generation new rules-based scripts.

As discussed above, the state of computing resources of a configurable device may be managed to prevent state drift. FIGS. 3.1-3.2 shows a method in accordance with one or more embodiments of the invention that may be performed by components of the system of FIG. 1.1.

FIG. 3.1 shows a flowchart of a method in accordance with one or more embodiments of the invention. The method depicted in FIG. 3.1 may be used to manage computing resources of a configurable device in accordance with one or more embodiments of the invention. The method shown in FIG. 3.1 may be performed by, for example, a computing resource state manager (e.g., 102.4, FIG. 1.2). Other components of the system illustrated in FIG. 1.1 may perform the method of FIG. 3.1 without departing from the invention.

In step 300, a validation check request is obtained.

In one or more embodiments of the invention, the validation check request is a scheduled validation check. For example, a schedule for checking the computing resources of a configurable device may determine when checks of the computing resources are to be performed. The schedule for checking the computing resources may be periodic, event-based, or specified in another manner.

In one or more embodiments of the invention, the validation check request is obtained from another entity. For example, a management entity operably connected to a configurable device may send a validation check request to the configurable device. In one embodiment of the invention, the check request is sent to the computing resources state manager hosted by the computing resources of the configurable device. One or more embodiments of the invention, the check request is sent to an out-of-band management platform hosted by the configurable device.

In one or more embodiments of the invention, the validation check request specifies that a check of the computing resources is to be performed. The validation check request may specify a time the performance of the validation check, that the validation check is to be performed upon the occurrence of an event, or that the validation check is to be performed as soon as possible. The validation check request may specify when the validation check is to be performed via other methods without departing from the invention.

In one or more embodiments of the invention, performing the validation check determines whether the computing resources of the configurable device are in a predetermined state. The validation check may include checking hardware resources, software resources, and/or other components of the computing resources.

In step 302, a checksum associated with computing resource rules stored in persistent storage is obtained.

In one or more embodiments of the invention, the checksum reflects an identity of the computing resource rules. In other words, the checksum may identify the computing resources rules from different computing resources rules.

In one or more embodiments of the invention, the checksum is a hash of the computing resources rules. The checksum may be other types of data structures related to the computing resources rules without departing from the invention. In one or more embodiments of the invention, the checksum requires fewer computing resources for storing the checksum then for storing the computing resources rules.

In one or more embodiments of the invention, storing the computing resources rules may require greater than 100 times the amount of computing resources required to store the checksum.

In step 304, the determination is made regarding whether the checksum matches the last checksum. A last checksum may be associated with computing resources rules by which the computing resources of the configurable device were measured for validation purposes.

For example, at a prior point in time, the computing resources may have been interrogated to determine whether they comply with computing resource rules. After the prior point in time, a new set of computing resources rules may have been obtained. If a new set of computing resource rules has been obtained, and the script for making the determination regarding whether the computing resource meeting the computing resource rules may have been obtained.

In one or more embodiments of the invention, the checksum of the current set of computing resources rules is checked to determine whether it matches the last checksum. If the checksums do not match, the rules may have changed and, consequently, the script may need to be generated.

In one or more embodiments of the invention, the determination may be made by sending a checksum to an out-of-band management platform. The out-of-band management platform may be hosted by the configurable device. The computing resources may send the last checksum to the out-of-band management platform. The out-of-band management platform may compare the last checksum to a checksum of computing resources rules stored in the out-of-band management platform. The out-of-band management platform may send the results of that comparison to the computing resources, e.g., the computing resources state manager. The results may be used as the determination.

If the checksum does not match the last checksum, the method may proceed to step 306. If the checksum does match the last checksum, the method may proceed to step 308.

In step 306, computing resources rules are obtained from an out-of-band management platform.

In one or more embodiments of the invention, the out-of-band management platform is hosted by the configurable device. The computing resources rules may be obtained via an always-on in-band channel from the out-of-band management platform. The computing resources rules may be obtained by sending a request to the out-of-band management platform.

The method may proceed to step 310 of the continuation illustrated in FIG. 3.2 following step 306.

Returning to step 304, the method may proceed to step 308 if the checksum does not match the last checksum.

In step 308, the computing resources rules are obtained from persistent storage. The persistent storage may be part of the configurable device. In one or more embodiments of the invention, the persistent storage is a portion of the computing resources of the configurable device.

The method may proceed to step 310 of the continuation illustrated in FIG. 3.2 following step 308.

FIG. 3.2 shows a diagram of a continuation of the flowchart of FIG. 3.1.

As discussed with respect to FIG. 3.1, the method may proceed to Step 310 follow step 306 and step 308.

In step 310, a rules-based script is generated using the computing resources rules and the computing resources configuration.

In one or more embodiments of the invention, the computing resources configuration the characteristics of the computing resources associated with the predetermined state. In other words, the computing resources configuration may specify the presence of hardware and software components of the computing resources and/or the configurations of hardware and/or software components of the computing resources for the computing resources to be in a predetermined state. In contrast, the computing resources rules may specify a limited number of rules. Each rule may specify one or more checks that are to be performed when a validation of the computing resources is performed.

In one or more embodiments of the invention, the rules-based script is generated by generating a copy of the step file associated with each of the rules. A step file may be a script file with associated input parameters. Supplying data for the input parameters may place the step file in condition for script execution.

Each copy of the step file associated with each of the rules may be populated using information from the computing resources configuration. For example, each of the step files may include parameters to be filled in using information from the computing resources configuration. The step files may be used to generate rules-based scripts.

For example, all, or a portion, of the step files may be aggregated into a script. Any quantity of scripts may be generated. Execution of the rules-based scripts may validate whether the computing resources are in a predetermined state.

In step 312, rules-based script is executed on the computing resources to obtain validation data.

In one or more embodiments of the invention, executing the rules-based scripts on the computing resources causes a processor of the resources to obtain information specified by the rules-based scripts, compare the obtained information to a select number of parameters of the computing resources configuration, and/or form remediation actions based on the outcome of the comparisons. The remediation actions may cause a validation data to be generated.

In one or more embodiments of the invention, a remediation action causes an outcome of the comparison to be stored as the validation data. Any number of outcomes may be stored as the validation data. By doing so, rich data regarding the state of the computing resources may be obtained via the execution of the rules-based scripts.

In one or more embodiments of the invention, a remediation is any action that attempts to modify a state of the computing resources to comply with a computing resources configuration. In other words, a remediation action may attempt to correct a deviation from the computing resources configuration.

In step 314, a validation report is generated based on the validation data.

In one or more embodiments of the invention, the validation report is a data structure that includes validation data. The validation report includes typesetting information, or other types of doubt information, that facilitate rendering of the validation data into a user readable format. For example, the validation report may be a portable document format document that includes validation data displayed in a user understandable manner. In one or more embodiments of the invention, the validation report specifies each deviation of the computing resources from the computing resources configuration.

In step 316, a determination is made regarding whether the validation report indicates compliance.

In one or more embodiments of the invention, the validation report indicates compliance when no deviations from the computing resources rules are indicated in the report.

If the validation report indicates compliance, the method may proceed to step 320. If the validation report does not indicate compliance, the method may proceed to step 318.

In step 318, the computing resources are remediated to obtain updated computing resources.

In one or more embodiments of the invention, the computing resources are remediated by modifying the computing resources. The modification may be one or more hardware and/or software modifications. For example, a hardware modification may be to disable a hardware device. In another example, a hardware modification may be to change a setting of the hardware device. In a still further example, a software modification may be to add an instance of an existing application hosted by the computing resources. In yet a further example, a software modification may be an update to a firmware associated with a hardware device of the computing resources. Modification may include any number and type of modifications to the hardware and/or software resources of the computing resources.

In one or more embodiments of the invention, the computing resources may not be entirely remediable without user intervention. For example, the validation report may indicate that the computing resources lack a processing core. In such a scenario, the remediation action may be to notify a user. For example, the validation report may be sent to a user to indicate that a state of the computing resources requires user intervention to be returned to a predetermined state.

Returning to step 316, the method may proceed to step 320 if the validation report indicates compliance. In step 320, a state of a solution is updated based on the validation report and/or the updated computing resources.

In one or more embodiments of the invention, the state of the solution is whether all of the configurable devices of a solution architecture, e.g., a distributed system, are in predetermined state.

In one or more embodiments of the invention, the state of solution is updated by sending a validation report to another entity. The another entity may be, for example, the management entity that manages the solution architecture. The another entity may be, for example, an archive entity that stores information regarding the state of each configurable device over time. The another entity may be, for example, a solution engineer tasked with managing the solution architecture. The state of the solution may be updated by sending validation report to other entities without departing from the invention.

In one or more embodiments of the invention, information regarding the updated computing resources is sent to another entity to update the state of the solution. For example, in a scenario where a remediation of the computing resources is performed, the state of the computing resources may be modified after the validation check is performed. In such a scenario, information regarding the updated state of the computing resources may be sent in conjunction with and/or in place of the validation report.

The method may end following step 320.

To further clarify aspects of the invention, a non-limiting example is provided in FIGS. 4.1-4.3. In FIGS. 4.1-4.3, a system similar to the system of FIG. 1.1 is illustrated. However, for the sake of brevity only a limited number of components of the system of FIG. 1.1 is shown in FIGS. 4.1-4.3.

EXAMPLE

Consider a scenario as illustrated in FIG. 4.1 in which example computing resources (400) of a configurable device (not shown) that is performing operations as part of a solution architecture. In this example, the solution architecture supports an organization's backend infrastructure by serving webpages including relevant company information.

To support the operations of the configurable device, at the point in time of FIG. 4.1, the example computing resources (400) includes (i) a first processor (402.2) that is operable and (ii) an inoperable second processor (402.4). The inoperable second processor (402.4) was damaged during shipping of the configurable device thus rendering the second processor inoperable. The example computing resources (400) further include a memory (402.6) and a persistent storage (408).

The hardware components of the computing resources (400) are utilized by four logical entities: a webpage server (404.2), a database manager (404.4), a slow operable fileserver (404.6), and a computing resources state manager (406.2). The first three of these logical entities are hosted to contribute to the solution architecture. As discussed above, the computing resources state manager (406.2) manages the state of the computing resources to ensure efficient contribution to the solution architecture. Of the three logical entities that support the solution architecture, the fileserver is slow because of an improper installation of a library utilized by slow file server (404.6) resulting in a serve rate of 150 files per second.

To support the solution architecture, the webpage server (404.2) serves pages using information included in a database archive (408.2) managed by the database manager (404.4). The slow fileserver (404.6) provides file hosting services for files stored in a file archive (408.4) that is a primary, not ancillary, goal of the solution architecture. In contrast, serving the webpages is an ancillary goal of the solution architecture. The File Archive (408.4) has a size of 20 Gigabytes.

After properly serving webpages for a period of time, a validation check is triggered due to the period of time elapsing. In response to the validation check, the computing resources state manager (406.2) performs validation check in accordance with the methods illustrated in FIGS. 3.1-3.2.

First, the computing resources state manager (406.2) determines that there is no last checksum because no validation checks of the example computing resources (400) have been performed. In response to the determination, the computing resources state manager (406.2) obtains example computing resource rules (420) as illustrated in FIG. 4.2.

The example computing resource rules (420) include three rules: a processor rule (420.2) that requires at least one operable processor to be present in the example computing resources, a fileserver rule (420.4) that requires an existing file server to be hosted by the example computing resources, and a database archive rule (420.6) that requires a database archive to be hosted by the example computing resources. These rules specify a limited number of checks be performed that, if met, indicate that the example computing resources are at a predetermined state that enable configurable device to contribute to the solution architecture.

After obtaining the example computing resource rules (420), example rules-based scripts (430) are generated as shown in FIG. 4.3. Specifically, three separate scripts (432, 434, 436) are generated and each corresponds to a respective rule.

The first script (432) corresponds to the processor rule (420.2). To generate the first script (432), object code associated with the processor rule (420.2) was populated using a computing resources configuration associated with the configurable device hosting the example computing resources. The first script (432) specifies that a processor having a first processor identifier (432.2) must have an operating point (432.4) that is operational (432.6). If the operating point (432.4) is not operational (432.6), the first script (432) includes a remediation action of suspending operations (432.8). In other words, if no operational processes are present the example computing resources are remediated by suspending their operations.

The second script (434) corresponds to the fileserver rule (420.4). The second script (434) specifies that a fileserver having a fileserver identifier (434.2) hosted by the example computing resources must have a serve rate (434.4) of 200 files per second (434.6). If the serve rate (434.4) of the fileserver is less than 200 files per second (434.6), the second script (434) includes a remediation action of allocating additional resources (434.8) for the fileserver.

The third script (436) corresponds to the database archive rule (420.6). The third script (436) specifies that a database archive having a database archive identifier (436.2) hosted by the example computing resources must have a size (436.4) of less than 10 Gigabytes (436.6). If the size (436.4) of the database archive is greater than 10 Gigabytes, the third script (436) includes a remediation action of accelerating garbage collection (436.8) for the database archive.

Returning to FIG. 4.1, after generating the example rules-based scripts (430), the computing resource state manager (406.2) orchestrates execution of the scripts. When the scripts are executed, the first script is satisfied because the first processor (402.2) is functional. In contrast, neither the second script nor the third script is satisfied because the slow fileserver (404.6) does not meet the 200 files per second requirement nor does the 20 Gigabyte size of the file archive (408.4) meet the 10 Gigabyte limit. Consequently, remediation actions for both the second script and third script are performed to remediate the behavior of these logical components.

After remediating the logical components, the computing resource state manager (406.2) generates a report based on the current state of the example computing resources (400). Specifically, the report indicates that the example computing resources (400) meet the computing resource requirements but that remediation actions were taken.

After generating the report, the computing resources state manager (406.2) sends the report to another entity.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device. The communication interface (512) may include a network adapter or other hardware element that supports communications via any type of networking technology/standard.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may improve the field of distributed system technology. Specifically, embodiments of the invention may improve distributed system technology by preventing both hardware and software drift. By preventing hardware and/or software drift, functionality of a component of a solution architecture may be more likely to be available. Consequently, the likelihood of successful operation of a distributed system is improved.

Embodiments of the invention may substantially reduce the computing resource requirements for managing drift when compared to contemporary distributed system. Specifically, embodiments of the invention may facilitate drift management using small sets of rules that specify only a minimal set of requirements necessary to ensure functionality of a configurable device. Further, the rules may be usable in conjunction with a complete device profile to generate executable scripts for drift identification and remediation. Thus, the rules may be personalized for each device based on an identity of a device by utilizing a corresponding computing resources configuration. Such configurations may be enforced across a distributed system thereby enabling uniformity of configuration in a distributed system. Accordingly, embodiments of the invention may provide a robust platform for preventing drift in a distributed system that personalizes the drift checking to each device in the distributed system, i.e., a solution architecture.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of a configurable device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A configurable device for use in a solution architecture, comprising:
   persistent storage storing:
      computing resources rules based on, in part, the solution architecture, and
      a computing resource configuration that specifies characteristics of computing resources of the configurable device that must be met for the computing resources to be in a predetermined state to meet requirements of the solution architecture; and
   a computing resources manager programmed to:
      generate a rules-based script using the computing resources rules and a portion of the computing resource configuration;
      execute the rules-based script to obtain a validation report that specifies a compliance failure of a portion of the computing resources;
      remediate the compliance failure by modifying the computing resources of the configurable device based on a remediation action specified by the computing resources rules;
      prior to generating the rules-based script:
         obtain a validation request for the computing resources of the configurable device;
         in response to obtaining the validation request:
            make a determination that previous computing resources rules that were used to generate a previous rules-based script match the computing resources rules; and
            in response to the determination, generate the rules-based script using the computing resources rules and the portion of the computing resource configuration by:
               using the previous rules-based script as the rules-based script.

2. The configurable device of claim 1, wherein remediating the compliance failure comprises:
   terminating an application hosted by the computing resources of the configurable device.

3. The configurable device of claim 1, wherein remediating the compliance failure comprises:
   suspending execution an application hosted by the computing resources of the configurable device.

4. The configurable device of claim 1, wherein generating the rules-based script using the computing resources rules and the portion of the computing resources configuration comprises:
   obtaining a file associated with a rule of the computing resources rules; and
   completing an executable script using the step file and a parameter specified by the portion of the computing resources configuration.

5. The configurable device of claim 4, wherein generating the rules-based script using the computing resources rules and the portion of the computing resources configuration further comprises:
   aggregating the executable script with a second executable script to obtain the rules-based script.

6. The configurable device of claim 1, wherein the computing resources manager is further programmed to:
   prior to generating the rules-based script:
      obtain a second validation request for the computing resources of the configurable device;
      in response to obtaining the second validation request:
         make a second determination that the previous computing resources rules that were used to generate a second previous rules-based script do not match the computing resources rules; and
         in response to the second determination, generate the rules-based script using the computing resources rules and the portion of the computing resource configuration by:
            generating at least two new scripts by parameter insertion into step files associated with the computing resources rules; and
            aggregating the at least two new scripts.

7. A method for managing a configurable device for a solution architecture, comprising:
   generating, by computing resources of the configurable device, a rules-based script using computing resources rules and a portion of a computing resource configuration that are both stored in persistent storage of the computing resources, wherein the computing resources configuration specifies characteristics of the computing resources of the configurable device that must be met for the computing resources to be in a predetermined state to meet requirements of the solution architecture;
   executing the rules-based script to obtain a validation report that specifies a compliance failure of a portion of the computing resources;
   remediating the compliance failure by modifying the computing resources of the configurable device based on a remediation action specified by the computing resources rules;
   prior to generating the rules-based script:
      obtaining a validation request for the computing resources of the configurable device;
      in response to obtaining the validation request:
         making a determination that previous computing resources rules that were used to generate a previous rules-based script match the computing resources rules; and
         in response to the determination, generating the rules-based script using the computing resources rules and the portion of the computing resource configuration by:
            using the previous rules-based script as the rules-based script.

8. The method of claim 7, wherein remediating the compliance failure comprises:
   terminating an application hosted by the computing resources of the configurable device.

9. The method of claim 8, wherein remediating the compliance failure comprises:
   suspending execution an application hosted by the computing resources of the configurable device.

10. The method of claim 8, wherein generating the rules-based script using the computing resources rules and the portion of the computing resources configuration comprises:
    obtaining a file associated with a rule of the computing resources rules; and
    completing an executable script using the step file and a parameter specified by the portion of the computing resources configuration.

11. The method of claim 10, wherein generating the rules-based script using the computing resources rules and the portion of the computing resources configuration further comprises:

aggregating the executable script with a second executable script to obtain the rules-based script.

12. The method of claim 7, further comprising:
prior to generating the rules-based script:
obtaining a second validation request for the computing resources of the configurable device;
in response to obtaining the second validation request:
making a second determination that the previous computing resources rules that were used to generate a second previous rules-based script do not match the computing resources rules; and
in response to the second determination, generating the rules-based script using the computing resources rules and the portion of the computing resource configuration by:
generating at least two new scripts by parameter insertion into step files associated with the computing resources rules; and
aggregating the at least two new scripts.

13. A non-transitory computer readable medium comprising computer readable program code, which when executed by a computer processor enables the computer processor to perform a method for managing a configurable device for a solution architecture, the method comprising:
generating, by computing resources of the configurable device, a rules-based script using computing resources rules and a portion of a computing resource configuration that are both stored in persistent storage of the computing resources, wherein the computing resources configuration specifies characteristics of the computing resources of the configurable device that must be met for the computing resources to be in a predetermined state to meet requirements of the solution architecture;
executing the rules-based script to obtain a validation report that specifies a compliance failure of a portion of the computing resources;
remediating the compliance failure by modifying the computing resources of the configurable device based on a remediation action specified by the computing resources rules;
prior to generating the rules-based script:
obtaining a validation request for the computing resources of the configurable device;
in response to obtaining the validation request:
making a determination that previous computing resources rules that were used to generate a previous rules-based script match the computing resources rules; and
in response to the determination, generating the rules-based script using the computing resources rules and the portion of the computing resource configuration by:
using the previous rules-based script as the rules-based script.

14. The non-transitory computer readable medium of claim 13, wherein remediating the compliance failure comprises:
terminating an application hosted by the computing resources of the configurable device.

15. The non-transitory computer readable medium of claim 13, wherein remediating the compliance failure comprises:
suspending execution an application hosted by the computing resources of the configurable device.

16. The non-transitory computer readable medium of claim 13, wherein generating the rules-based script using the computing resources rules and the portion of the computing resources configuration comprises:
obtaining a step file associated with a rule of the computing resources rules; and
completing an executable script using the step file and a parameter specified by the portion of the computing resources configuration.

17. The non-transitory computer readable medium of claim 16, wherein generating the rules-based script using the computing resources rules and the portion of the computing resources configuration further comprises:
aggregating the executable script with a second executable script to obtain the rules-based script.

* * * * *